US005396062A

United States Patent [19]

Eisentraut et al.

[11] Patent Number: 5,396,062

[45] Date of Patent: Mar. 7, 1995

[54] RECEPTACLE HAVING AN INTERNAL SWITCH WITH AN EMITTER AND A RECEIVER

[75] Inventors: David K. Eisentraut, Hummelstown; Bradford K. Gauker, Mechanicsburg; Lee W. Steely, Mohnton; David S. Szczesny, Palmyra, all of Pa.; Alan W. Brownlie, Skaneateles, N.Y.; Jack W. Critser, Bowie, Md.

[73] Assignee: The Whitaker Corporation, Wilmington, Del.

[21] Appl. No.: 68,815

[22] Filed: May 27, 1993

[51] Int. Cl.[6] .................... G01D 5/34

[52] U.S. Cl. .................... 250/229; 250/239

[58] Field of Search .................... 250/229, 222.1, 239, 250/551; 200/16 E, 16 D

[56] References Cited

U.S. PATENT DOCUMENTS

| | | | |
|---|---|---|---|
| 4,379,606 | 4/1983 | Clark et al. | 339/17 CF |
| 4,397,513 | 8/1983 | Clark et al. | 339/91 R |
| 4,418,979 | 12/1983 | Takashima | 339/113 L |
| 4,853,823 | 8/1989 | Arechavaleta et al. | 361/100 |
| 4,899,217 | 2/1990 | MacFadyen et al. | 358/86 |
| 5,036,191 | 7/1991 | Senoo | 250/229 |
| 5,043,531 | 8/1991 | Gutenson et al. | 174/49 |
| 5,043,593 | 8/1991 | Tsutsumi et al. | 250/229 |
| 5,112,237 | 5/1992 | Yang | 439/1881 |
| 5,281,154 | 1/1994 | Comerci et al. | 439/107 |
| 5,281,155 | 1/1994 | Comerci et al. | 439/107 |

*Primary Examiner*—David C. Nelms
*Assistant Examiner*—Que T. Le
*Attorney, Agent, or Firm*—Katherine A. Nelson

[57] ABSTRACT

A power receptacle 10 includes a housing 12 having a cover plate 46 therefore and securable thereto, an associated pair of receptacle contacts 70 mounted within the housing 12, the contacts 70 each having pair of arms 74 having openings 78 therethrough to define a beam receiving passage 80 completely through the receptacle contacts 70, means for directing a beam of light through the beam receiving passage and including at least a light emitting component 58, and means for detecting a beam of light passing through the beam receiving passage at least including a light receiving component 60, at least one of the components 58, 60 being electrically connected ultimately to a microprocessor. Upon entry of complementary blades 84 of a plug of an electrically powered device into the receptacle contacts, the beam receiving passage 80 is blocked, thereby breaking transmission of light between the emitter 58 and receiver 60, which is ultimately detected by the microprocessor.

12 Claims, 7 Drawing Sheets

RECEPTACLE HAVING AN INTERNAL SWITCH WITH AN EMITTER AND A RECEIVER

FIELD OF THE INVENTION

This invention relates to electrical receptacles and more particularly, to receptacles to be used in programmable integrated wiring systems.

BACKGROUND OF THE INVENTION

U.S. Pat. No. 4,899,217 discloses a communication and energy control system for houses. The system includes a number of different services such as electrical power, heating ventilation and air condition control, security, telecommunications, etc. One major feature of such a system is the ability to control appliances and other devices throughout the house from a single location, such as a system controller, control panel or switch. It is desirable, therefore, that the system has diagnostic capabilities so that the operator can determine if for example, an appliance at a remote location within the house is connected to its associated receptacle or outlet.

One method to accomplish the diagnostic capabilities is to use a switch within the receptacle that will interact with a relay when a mating plug has been inserted into the outlet of the receptacle. Furthermore, it is desirable that such a switch occupy a minimal amount of space and be cost effective to both manufacture and assemble.

SUMMARY OF THE INVENTION

An object of the present invention is to provide an "intelligent" or "smart" electrical receptacle, that is, one that has means for detecting when a mating plug is inserted or removed from the receptacle and communicating that fact to a programmed power distribution system.

It is another object of the invention to provide a receptacle that is capable of relaying messages such as, for example, something has been plugged into or inadvertently unplugged from the receptacle, or the plugged in article is not functioning properly.

Another object of the invention is to provide a safety feature for the receptacle, such that no power is present in the receptacle unless and until something has been plugged into it.

A further object of the invention is to provide an optical switch rather than a mechanical switch for the intelligent electrical receptacle.

Another object of the present invention is to provide a receptacle for use in a closed loop and programmed power distribution system.

The present invention meets the above objects by providing an associated pair of receptacle contacts mounted within a housing, the contacts having pairs of arms aligned with blade receiving apertures of a cover plate. Openings through the arms of the receptacle contact sections are generally transversely coaligned to define a beam receiving passage completely through the receptacle contacts sections and means for directing a beam of light through the beam receiving passage and means for detecting that beam of light as it passes through the passage.

The means include at least a light emitting component and a light receiving component respectively, with at least one of the components electrically connected ultimately to a microprocessor. Upon entry of complementary blades of a plug into the receptacle contact section, the blades block the beam receiving passage, thereby breaking the transmission of light between the emitter and receiver and ultimately communicating that to the microprocessor.

In one preferred embodiment of the invention, the receptacle further includes a first light reflecting surface proximate the beam receiving passageway and opposing the light receiving component. The light emitting component is mounted on a wall surface at a location and orientation selected so that the light emitted therefrom will strike and be reflected by the reflective surface, into the beam receiving passage and received by the light receiving component. In another embodiment, the receptacle includes two light reflecting surfaces, one on each side of the beam receiving passageway, such that light emitted from the light emitting component is reflected through the passageway, is received by the other reflecting surface and is again reflected so that the light strikes the light receiving component.

In another embodiment of the invention, the light emitting and light receiving components are mounted on opposed wall surfaces and oppose each other along the beam receiving passage.

These and other objects and advantages of the present invention may be appreciated by studying the following detailed description of the preferred embodiment together with the drawings.

DETAILED DESCRIPTION OF THE DRAWINGS

Figure 1:
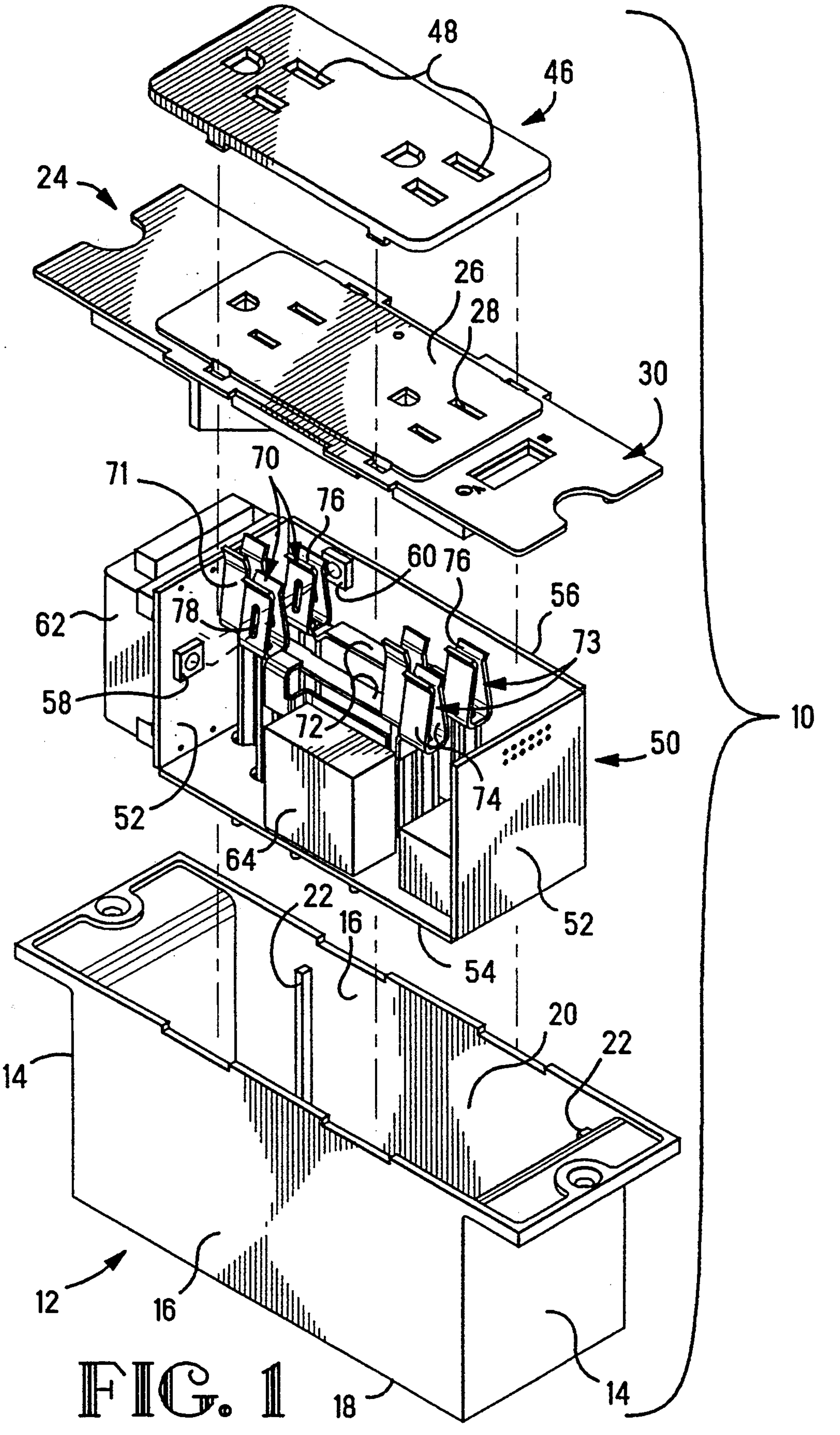
FIG. 1 is an exploded view of the receptacle including the switch of the present invention.
Figure 2:
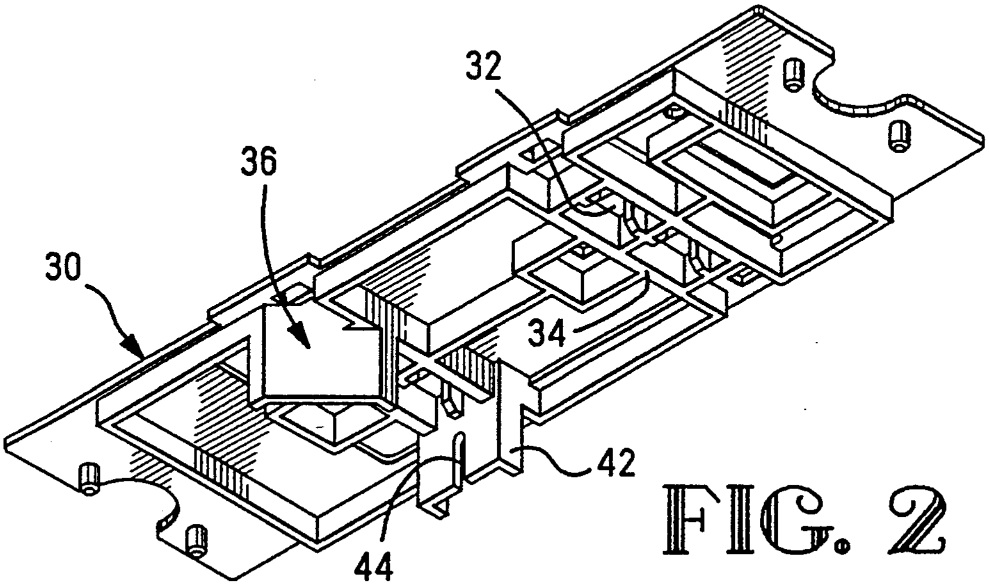
FIG. 2 is a prospective view of the underside of the front cover assembly of FIG. 1.
Figure 3:
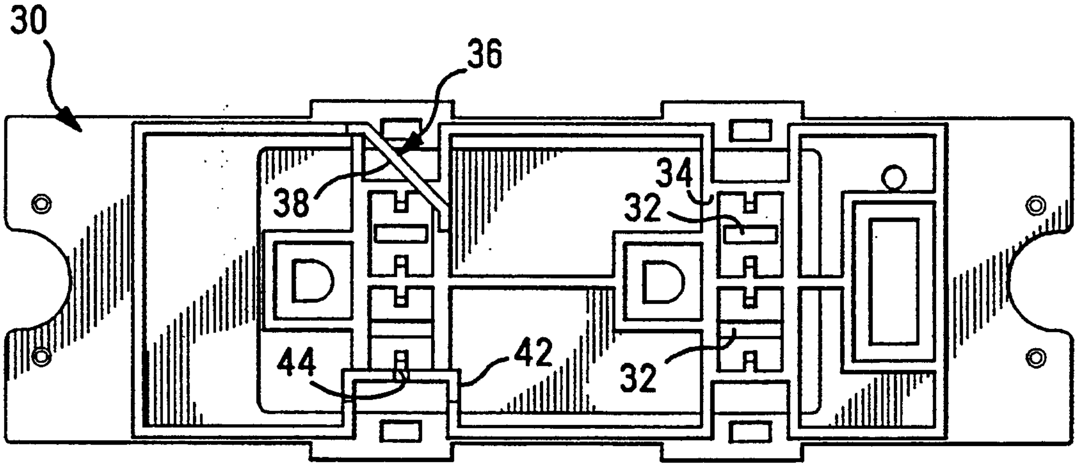
FIG. 3 is a bottom plan view of the front cover assembly of FIG. 2.

Referring now to FIGS. 1 through 4, receptacle 10 of the invention is comprised of a housing 12 and a front assembly 24 including a cover plate 46 and at least one pair of receptacle contacts 70 mounted within the housing, the housing further including means for communicating with a microprocessor when a complimentary plug has been inserted into or removed from electrical connection with receptacle contacts 70. Housing 12 includes opposed end walls 14, opposed side walls 16 and a rear wall 18, which together define a cavity 20 for receiving receptacle insert 50 therein. As shown in FIG. 1, end walls 14 and side walls 16 may also include spacing ribs 22, which help to position insert assembly 50 within housing 12. A front housing assembly 24 includes a first plate 26 defining a plug receiving face having apertures 28 extending therethrough and a second plate 30 having apertures 32 extending therethrough, as best seen in FIGS. 2 and 3. Referring again to FIG. 1, front assembly 24 further includes cover plate 46 having apertures 48 extending therethrough. In the assembled receptacle 10, the apertures 48, 28 and 32 are aligned with each other and are configured to receive the blades of a mating plug connector.

Figure 4:
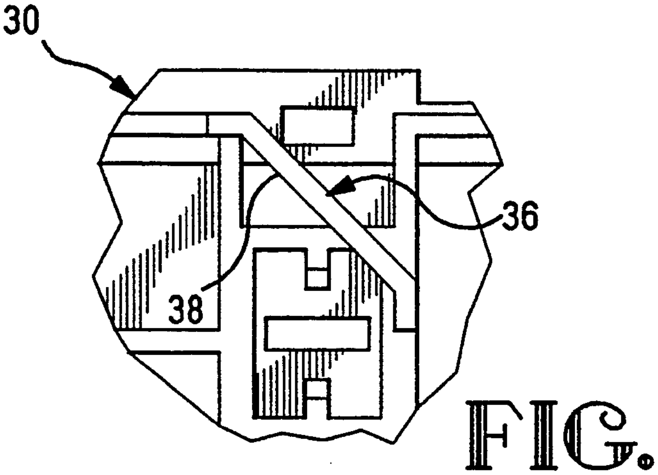
FIG. 4 is an enlarged fragmentary portion of FIG. 3.

Referring again to FIGS. 2 and 3, the underside of plate 30 includes a plurality of inner walls which cooperate with the receptacle contacts 70 and act as guide means for receiving the prongs of the mating contacts for plug to direct them to the engagement with the contacts 70. FIGS. 2, 3 and 4 show the position of a reflector wall 36 having a reflective surface 38 extending on one side thereof. Surface 38 may be made reflective by the use of a silver tape or foil or by other means known in the art. One suitable foil is available from 3M, St Paul, Minn. as silver backed reflective tape. FIGS. 2 and 3 also show a shroud 42 having a light receiving slot 44 extending therein from the leading edge thereof. The function of the reflective wall 38 and shroud 42 will be more fully explained below.

Referring again to FIG. 1, receptacle includes an insert assembly 50 having opposed end walls 52, a bottom wall 54 and a side wall 56. In the preferred embodiment, a plurality of electrical components and electric circuits are contained on these walls. For purposes of clarity, only the optical components, the transmitter 58 and the receiver 60 are shown on the walls. At least one of the light emitting and light receiving components is electrically connected ultimately to a micro-processor through the circuitry contained in the circuit board forming insert 50. Alternatively both components may be electrically connected to the microprocessor. Furthermore, the circuitry can be designed so that in the event one of the components fails, the receptacle may remain live when an appliance is unplugged or conversely may remain dead even when something is plugged into it, whichever is desired. In the presently preferred embodiment, only the light receiving component is electrically connected ultimately to the microprocessor. The transmitter is a light emitting diode (LED) that remains powered at all times. Should the LED fail, the receptacle would remain live whether or not an electrically powered device was plugged into the receptacle, thereby allowing a plugged in device to continue to function.

The insert 50 further includes a transformer 62 and a relay 64. The insert 50 further includes a plurality of contact 70 having portions extending through lower wall 54 for interconnection to the hot, neutral and ground wires of the house wiring system. As is seen in FIG. 1, the receptacle 10 of this invention is shown as a duplex receptacle and includes two pairs of contacts 70, 73 at each end of bus bars. The assembly further includes ground contact 71. Contact arm 74 extend upwardly to define blade receiving entrances 76. At least one set 70 of the contacts includes openings 78 in the arms that are generally transversely coaligned to define a beam receiving passageway 80 extending completely through the receptacle contact sections in a selected direction, as best seen in FIG. 5.

Figure 5:
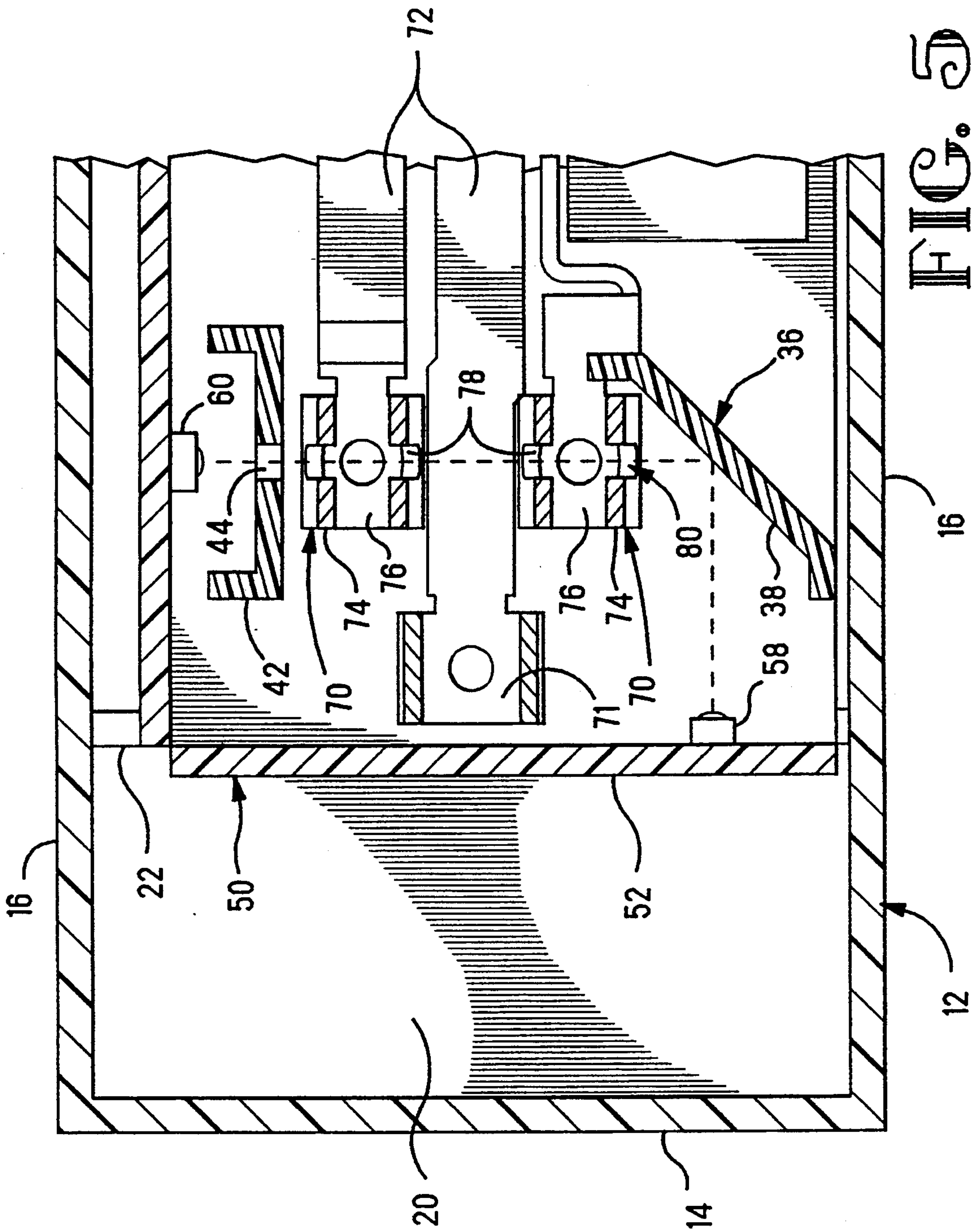
FIG. 5 is a fragmentary sectional view of the assembled receptacle of FIG. 1 taken immediately behind the cover plate and illustrating the features of the switch and the optical path in the preferred embodiment.
Figure 7:
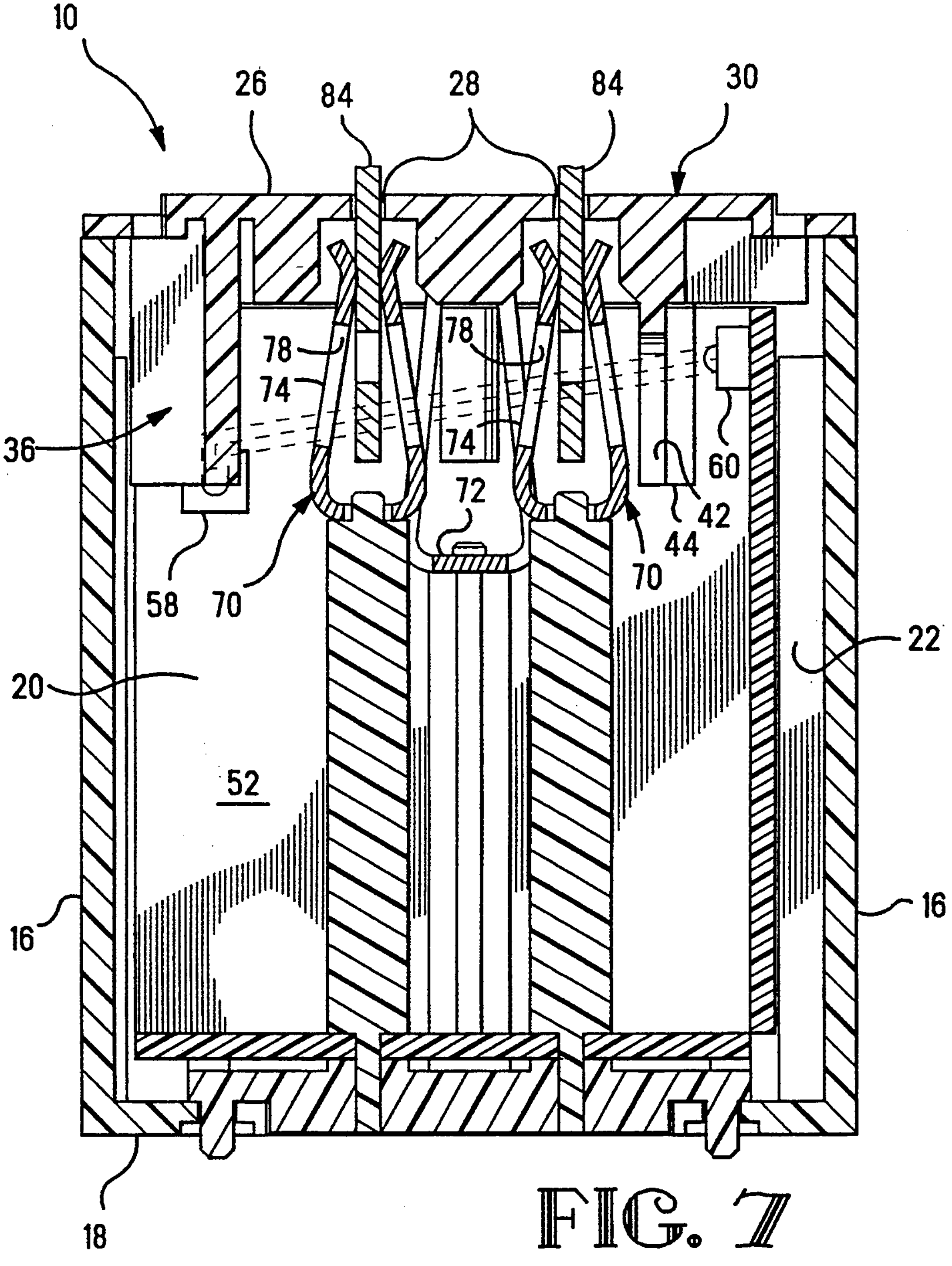
FIG. 7 is a fragmentary cross-sectional view of the receptacle taken along line 7—7 of FIG. 6.

FIGS. 5 and 7 further illustrate the optical path of the light. As a beam of light is emitted from the transmitter, it strikes the reflective surface 38 of reflective wall 36 and is directed through the beam receiving passage 80 to be detected by the receiver 60. As is shown in these figures, the shroud 42 with beam receiving passageway 44 blocks extraneous light from being detected by the receiver 60.

Figure 6:
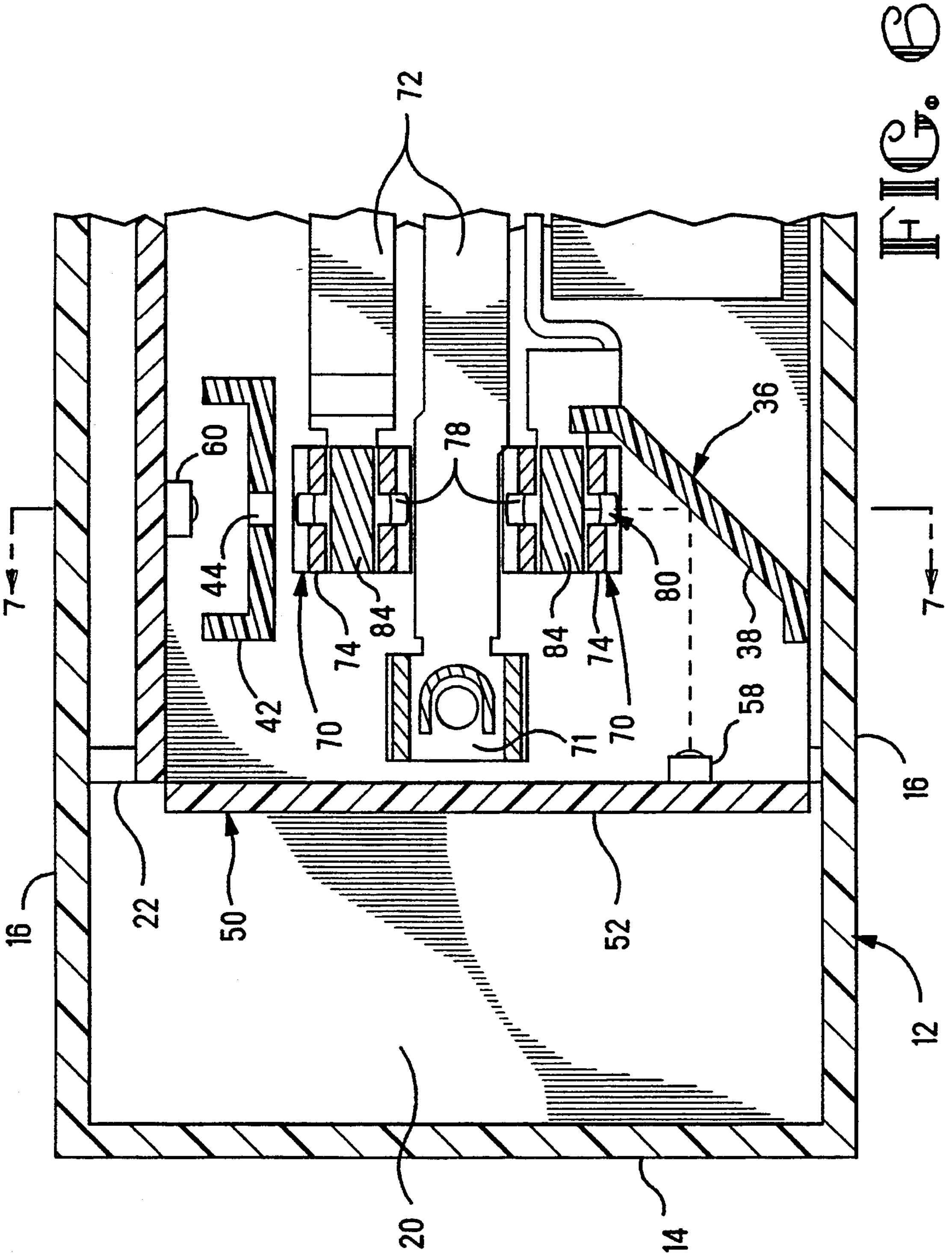
FIG. 6 is a view similar to FIG. 5 with blades of a mating plug blocking the optical path.

As shown in FIG. 6, when the blades 84 of a mating plug of an electrically powered device are engaged in the receptacle contacts 70, the blades 84 block the beam receiving passageway 80 thereby breaking transmission of the light between the emitter 58 and receiver 60. This break in the light beam is detected by the receiver, which switches a transistor, which in turn causes the relay to close.

In the preferred embodiment, the aperture 78 are elongate and extend in a direction perpendicular to the cover plate 46 in front assembly 24. As is shown in FIGS. 1 and 7, it is further preferable that the light emitting component 58 be mounted a first distance from the cover plate 46 and front assembly 24 and the light detecting component 60 be mounted a second distance from the cover plate 46 and front assembly 24 with the second distance being selected to be different from the first. Thus the light beam will be directed at an angle relative to the horizontal. The angularity of the light beam is preferred so that the beam will strike each of the respective slots 78 at a slightly different distance from the cover plate 46. Thus, as shown in FIG. 7, if the blades 84 of a mating plug have a hole extending through them, light passing through the hole of one plug blade 84 will strike a solid portion of the other plug blade 84 thereby breaking the transmission of light between the emitter 58 and receiver 60 and causing the switch to function.

Figure 8:
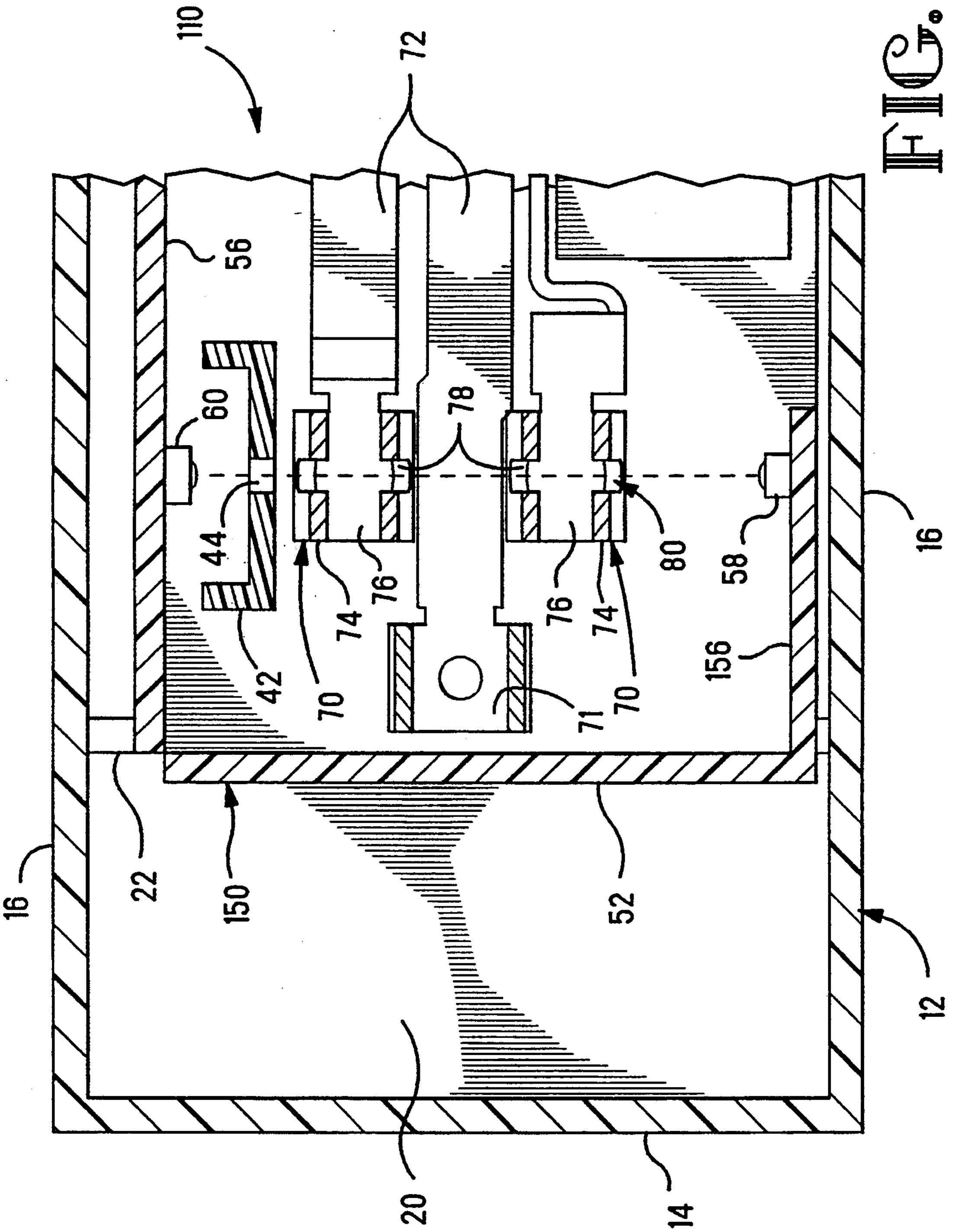
FIG. 8 is a view similar to FIG. 5 illustrating an alternative embodiment of the receptacle.

FIG. 8 shows a first alternative embodiment 110 of the receptacle wherein the insert 150 includes a further sidewall 156 that extends along at least a portion of the outer side walls of the receptacle. In this embodiment the transmitter 58 is mounted on opposed wall surfaces from the receiver 60 thereby eliminating the need for a reflective surface on the underside of the front assembly 24.

Figure 9:
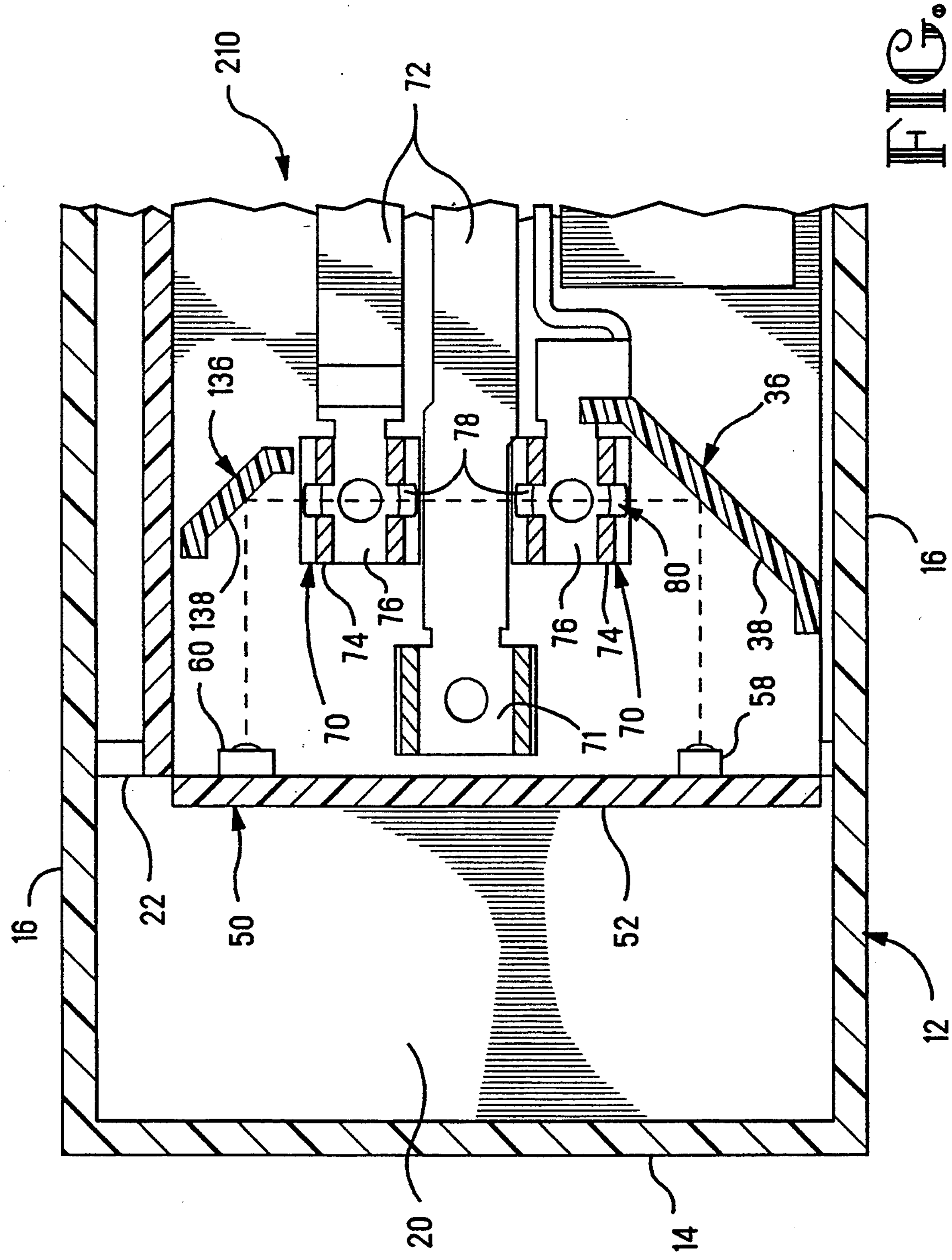
FIG. 9 is a fragmentary view similar to FIG. 5 illustrating a further alternative embodiment of the receptacle.

FIG. 9 shows a further embodiment 210 which has the transmitter 58 and the receiver 60 mounted along the same wall of the insert member and the cover plate 30 includes a second reflector wall 136 having a reflective surface 138 thus the light is emitted from the transmitter 58 reflected by surface 38 on wall 36 through the beam receiving passageway 80 which is then reflected on surface 138 of reflective wall 136 to be directed to the receiver 60.

For purposes of illustrating the invention, only one pair of the contacts in the receptacle is shown with the switch of the present invention. It is to be understood that both pairs of contacts may be provided with the elongate openings and that two light emitting components and two light receiving components may be mounted on the walls to provide a second switch, thereby increasing the diagnostic capabilities of the system.

It is thought that the receptacle of the present invention and many of the attendant advantages will be understood from the foregoing description. It is apparent that various changes may be made in the form, construction, and arrangement of the parts used without departing from the spirit or scope of the invention or sacrificing all of its material advantages.

We claim:

1. A power receptacle comprising:

a housing mountable within an opening of a wall and a cover plate therefore and securable thereto;

an associated pair of receptacle contacts mounted within said housing, said contacts each having a pair of arms coextending towards a plug receiving region of a cover plate and concluding in blade receiving entrances aligned with blade-receiving apertures of said cover plate;

said arms of said receptacle contact sections having openings therethrough, said openings being generally transversely coaligned to define a beam receiving passage completely through said receptacle contact sections in a selected direction;

means for directing a beam of light through said beam receiving passage and including at least a light emitting component; and means for detecting a beam of light passing through said beam receiving passage at least including a light receiving component;

at least one of said light receiving and said light emitting components being electrically connected ultimately to a microprocessor;

whereby entry into said receptacle contact sections by complmentary blades of a plug of an electrically powered devices, blocks said beam receiving passage thereby breaking transmission of light between said emitter and receiver, which is ultimately detected by said microprocessor.

2. The power receptacle of claim 1 wherein said housing further includes a shroud surrounding said light receiving component to block extraneous light.

3. The power receptacle of claim 1 wherein said light emitting and light receiving components are mounted on opposed wall surfaces and oriented to oppose each other along said beam receiving passage.

4. The power receptacle of claim 3 wherein said openings in said arms are elongate and extend in a direction perpendicular to said cover plate, said light emitting component is mounted a first distance from said cover plate, and said light receiving component is mounted a second distance from said cover plate, said second distance being selected to be different from said first distance with said light emitting and light receiving components being aligned with each other on an axis extending through said elongate opening and not parallel to said cover plate.

5. The power receptacle of claim 1 further including a first light reflecting surface proximate said beam receiving passage and opposing said light receiving component, said light emitting component being mounted on a wall surface at a location and in an orientation selected so that light emitted therefrom will strike and be reflected by said reflective surface into said beam receiving passageway to De received by said light receiving component.

6. The power receptacle of claim 5 wherein said housing further includes a shroud surrounding said light receiving component to block extraneous light.

7. The power receptacle of said claim 5 wherein said openings in said arms are elongate and extend in a direction perpendicular to said cover plate, said light emitting component is mounted to said wall surface at a first distance from said cover plate, and said light receiving component is mounted to another wall surface at a second distance from said cover plate, said second distance being selected to be different from said first distance.

8. The power receptacle of claim 5 wherein said light emitting and light receiving components are mounted on wall surfaces that are adjacent and substantially perpendicular to one another, one of said components being oriented to oppose said first reflective surface.

9. The power receptacle of claim 5 further including a second light reflecting surface proximate said beam receiving passage and opposing said first light reflecting surface, said light emitting component being mounted on a wall surface at a location and in an orientation selected so that light emitted therefrom will strike and be reflected by said first reflective surface into said beam receiving passageway to strike and be reflected by said second reflective surface to be received by said light receiving component.

10. The power receptacle of claim 9 wherein said openings in said arms are elongate and extend in a direction perpendicular to said cover plate, said light emitting component is mounted a first distance from said cover plate, and said light receiving component is mounted a second distance from said cover plate, said second distance being selected to be different from said first distance with said light emitting and light receiving components being aligned with each other on an axis extending through said elongate opening and not parallel to said cover plate.

11. The power receptacle of claim 9 wherein said housing further includes a shroud surrounding said light receiving component to block extraneous light.

12. The power receptacle of claim 9 wherein said light emitting and light receiving components are mounted on spaced locations on a same wall surface, each of said components being oriented to oppose one of said first and second reflective surfaces.

* * * * *